United States Patent [19]

Cherry et al.

[11] Patent Number: 4,765,792
[45] Date of Patent: Aug. 23, 1988

[54] SURFACE MOUNTED TRUCK LEVELER

[75] Inventors: Charles W. Cherry; William J. Benda, both of Edmond, Okla.

[73] Assignee: Autoquip Corporation, Guthrie, Okla.

[21] Appl. No.: 29,011

[22] Filed: Mar. 23, 1987

[51] Int. Cl.⁴ .............................................. E02C 3/00
[52] U.S. Cl. .................... 414/401; 414/402; 414/584; 254/88; 14/71.1; 14/71.7
[58] Field of Search ............. 414/401, 402, 584, 678; 254/88; 14/71.7, 71.3, 71.1, 69.5

[56] References Cited

U.S. PATENT DOCUMENTS

| | | | |
|---|---|---|---|
| 2,560,064 | 7/1951 | Astry | 14/71.1 X |
| 2,607,937 | 8/1952 | Stone | 14/69.5 |
| 3,027,580 | 4/1962 | Haack | 14/69.5 |
| 3,252,590 | 5/1966 | Nielsen | 414/678 |
| 3,409,923 | 11/1968 | Walker | 14/71.7 |
| 3,995,342 | 12/1976 | Wiener | 14/71.3 |
| 4,472,099 | 9/1984 | Hahn et al. | 14/71.1 X |
| 4,624,446 | 11/1986 | Gould | 254/88 |

FOREIGN PATENT DOCUMENTS

| | | | |
|---|---|---|---|
| 598028 | 12/1925 | France | 414/678 |
| 702701 | 1/1954 | United Kingdom | 414/401 |
| 916257 | 1/1963 | United Kingdom | 414/401 |
| 1499741 | 2/1978 | United Kingdom | 14/69.5 |
| 998323 | 12/1979 | U.S.S.R. | 254/88 |

Primary Examiner—Frank E. Werner

[57] ABSTRACT

The leveler is positioned upon the flat top surface of the truck apron at some predetermined position in front of the dock. In the down position the surface cover plate of the leveler is parallel with the flat top surface of the truck apron. The lifting is provided by hydraulic cylinders secured to the leveler inwardly from the rear whereby avoiding interference with ancillary dock equipment. Thus, an aperture can be provided in the rear to accommodate a truck restraining device.

5 Claims, 3 Drawing Sheets

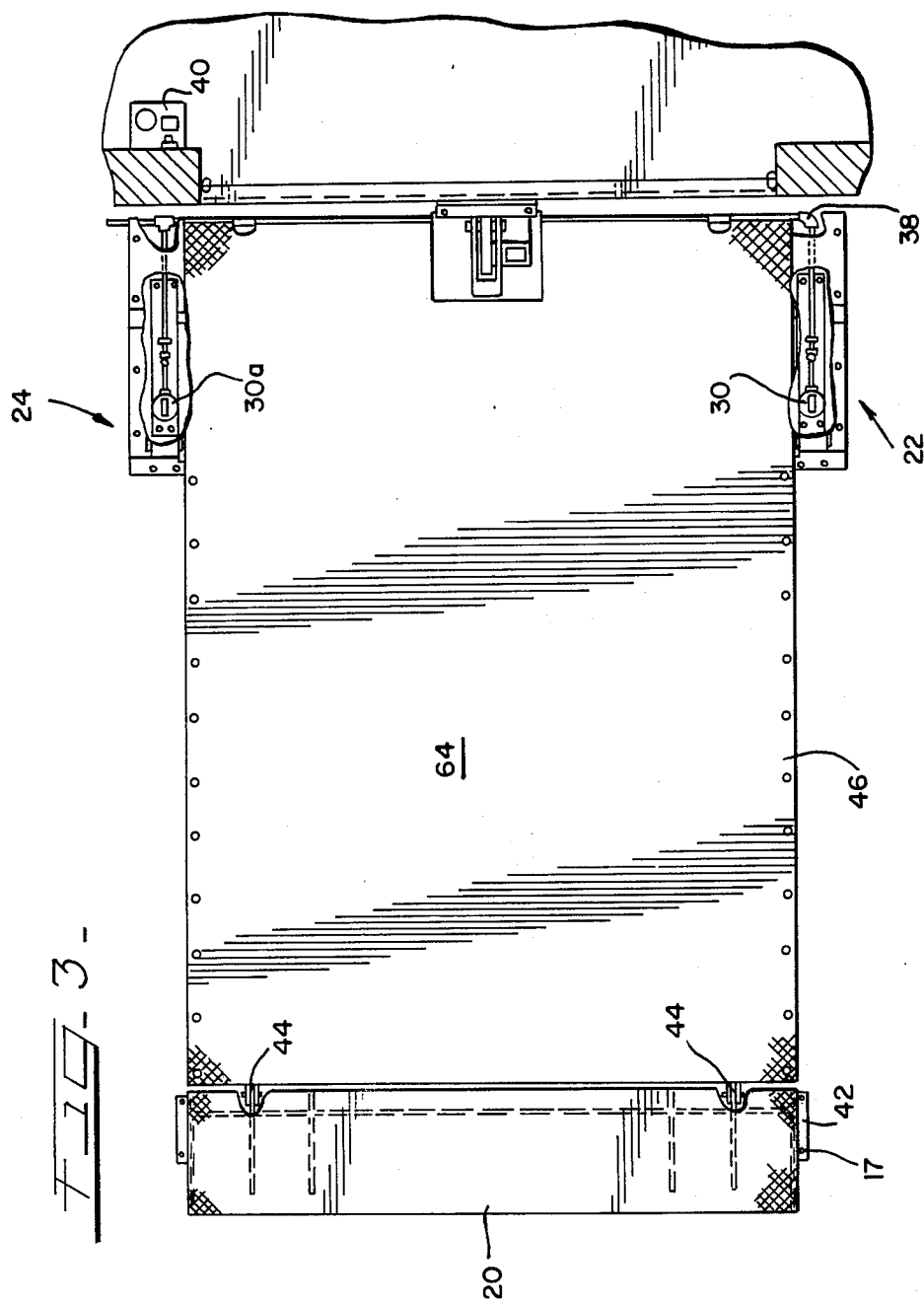

Fig-4-
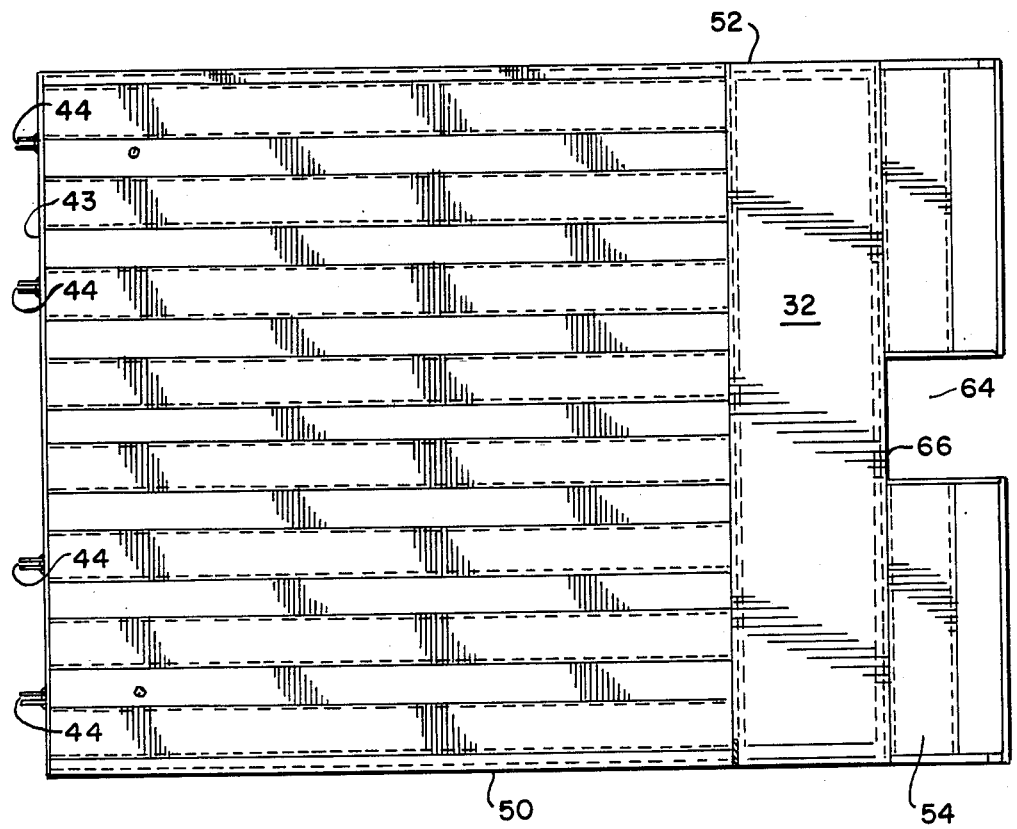
Fig-5-
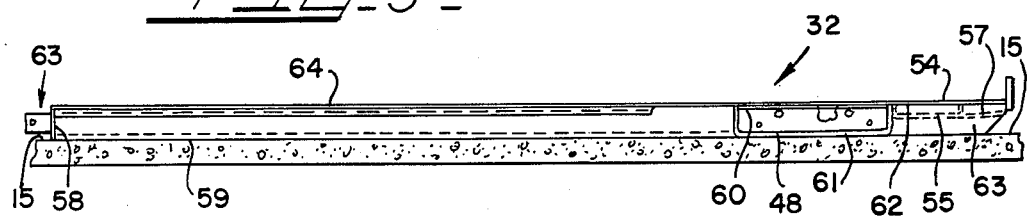

SURFACE MOUNTED TRUCK LEVELER

This invention relates to a truck leveling device which is secured to a flat truck apron that is of relatively uniform elevation and more particularly, to a surface-mounted truck leveler which cooperates with truck restraining devices, dock shelters and dock seals.

As is well known in the art, it is often necessary to raise the rear portion of a truck to achieve alignment with an adjacent loading dock. Once alignment is achieved, a steel ramp or bridge plate, for example, is pivoted from the loading dock to the bed of the truck and loading and unloading can commence. In most cases, a mechanical device, such as a fork lift, is employed to actually move the material into and out of the truck or trailer.

A number of different devices are provided to achieve the necessary alignment of the truck bed and the loading dock. One common point device is mounted in a pit in the loading dock itself and includes a ramp which is hinged to the dock. The front of the ramp can be mechanically moved to the desired height. Another type of device is known as a pit-mounted leveler, which is mounted in a pit, normally concrete, in front of the loading dock. In practice, the truck is driven onto the truck leveler whose surface is flush with the truck apron. Lifting means located in the pit are then actuated to elevate the bed of the truck to the proper level for cooperation with the dock. A third type of truck leveling device, and the one in which the invention hereunder consideration is incorporated, is a leveling device that lays flat upon a truck apron of a uniform elevation in front of a dock, without any pit or other surface-modification requirements.

The particular location of the truck leveler must be such that it cooperates with other devices found in the loading dock area. Such ancillary dock devices include dock shelter devices, dock seals, dock bumpers and truck locks or truck restraining devices. Simply stated, any type of truck leveler which would limit the use of these devices in conjunction with a loading dock would not be desirable. In fact, the truck-lock devices are safety oriented, having their purpose to keep the truck secure to the dock such that separation is impossible. In the event of separation, it is obvious the fork lift and operator could fall to the truck apron with the possibility of both physical, as well as property, damage. With the crisis in insurance over the past several years, such devices have become almost mandatory.

SUMMARY OF THE INVENTION

The invention relates to a surface-mounted truck leveler which is bolted to a flat truck apron of relatively uniform elevation at a predetermined position in front of the loading dock. In order to cooperate with the dock shelter means, dock seal means, dock bumper means and most importantly, the truck restraining device, a major load-carrying primary platform bolster is provided inwardly from the rear end of the truck leveler. A load supporting rear portion extends from the primary platform bolster to the back end of the leveler which is positioned closest to the loading dock. Centrally located within said load-supporting rear portion is an aperture or cut-out wherein is accommodated the truck restraining device of whatever design.

The lifting means for raising and lowering the surface mounted truck leveler consists of hydraulic or mechanical means secured to the primary platform bolster on both sides of the platform. Thus, the lifting means are moved forwardly away from the rear and thus contact and interference with any type of dock shelter means or dock seal means is avoided.

By being located in from the rear, the primary platform bolster itself carries the majority of the load of the truck, as well as the lifting means employed for actuation. Therefore, it is possible to provide for a centrally located truck restraining aperture and to avoid interference with the lifting means or related structure and any part of any ancillary dock device.

Other objects and advantages will appear in the course of the following description.

DESCRIPTION OF THE DRAWINGS

The drawings illustrate the best mode presently contemplated of carrying out the invention.

In the drawings:

FIG. 3 is a top view of the leveler shown in FIG. 2 partially showing the relevant dock structures;

FIG. 4 is a partial bottom view of the surface-mounted truck leveler; and

FIG. 5 is a side view of FIG. 4.

DESCRIPTION OF THE PREFERRED EMBODIMENT

Figure 1:
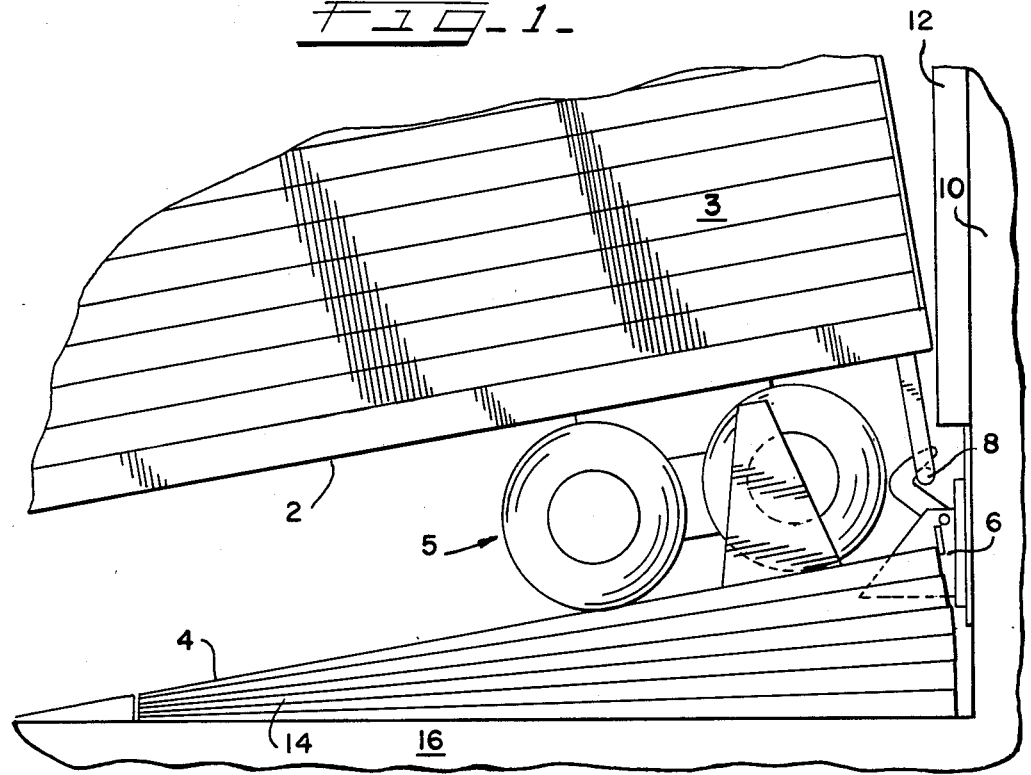
FIG. 1 is a side view of a surface-mounted leveler incorporating the invention and having the rear part of a truck positioned thereon.

Referring now to FIG. 1 wherein a truck 2 is shown positioned upon the surface mounted truck leveler means 4 in a raised position. The truck 2 includes fixed to the rear end 3 thereof a set of tire means 5. To the rear thereof the truck restraining device 6 is shown secured to the I.C.C. bar 8 whereby the truck cannot or is restrained from movement away from the loading dock generally identified as 10. As is understood, the ancillary dock devices include dock shelter device 12, which is well-known in the prior art, is shown secured to the outer wall of the loading dock 10. An accordion skirt 14 extends downwardly from the first side edge 50 (See FIGS. 4 and 5) of the surface-mounted truck leveler means 4 to the truck apron 16. It should be understood that the truck apron means 16 is flat and of relatively uniform elevation in the area under the surface-mounted truck leveler 4, and includes flat top surface means 15.

Figure 2:
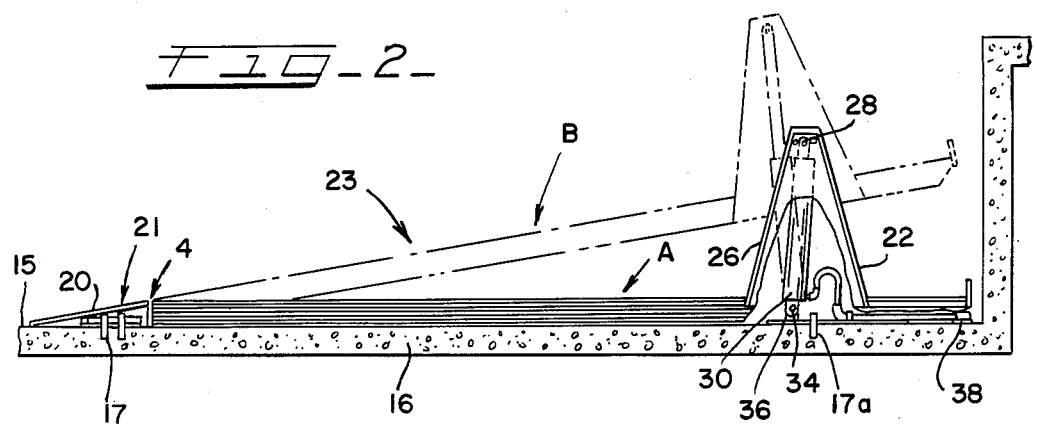
FIG. 2 is a partial side view having some of the portions broken away of the surface-mounted truck leveler including a phantom position B which represents the leveler in a raised position, as in FIG. 1.

Since the truck apron 16 is of relatively uniform elevation, and when the surface-mounted truck leveler 4 is in the down or lowered position as shown in FIG. 2, no part of the truck leveler extends above the surface cover plate means 64, except the lifting support tower means 22 and 24, the alignment of the truck need not be exact. That is, the truck tires need not come up exactly upon the approach ramp means 20, but could be, in fact, driven over one side and then maneuvered until a generally central location is achieved between lifting support tower means 22 and 24. It should be noted that both lifting means support towers are identical with the exception being that some of the parts are reversed and, therefore, it is appreciated a discussion of one will apply equally as well to the other.

The lifting support tower means 22 and 24 include a frame portion 26 which is designed to connect the rod end or first end means 28 of the hydraulic cylinder means 30 to the primary platform bolster means 32 and to protect the hydraulic cylinder means 30 from being accidentally damaged should any part of the truck make contact therewith. In the embodiment shown in FIG. 2, the rod end or first end means 28 is pivotally secured to the frame portion 26 while the rear end cap means or second end 34 is pivotally secured to a support plate 36 that is independent thereof and bolted or otherwise suitably fixed to the truck apron. As is apparent, any type of lifting means which is capable of raising the surface-mounted truck leveler 4 from the lowered position A to the phantom position B shown in FIG. 2 would be equally suitable. The hydraulic cylinders shown in are provided only as a single preferred embodiment. Suitable conduit means 38 provide a supply of pressurized oil from the pump means 40 partially shown in FIG. 3 to the two respective cylinders, as is well known in the prior art.

Referring now to both FIGS. 2 and 3, it will be noted that the approach ramp means 20 is secured to the truck apron 16 in a preferred embodiment via the bracket and bolt means 42. As is apparent, the bracket portion is welded to or otherwise suitably fixed to the approach ramp while the bolts are simply secured via concrete anchor means 17 to the truck apron. Any means would be satisfactory as long as the approach ramp means 20 is secured in place. A primary pivot connection means 44 is provided to allow the pivotal movement between the approach ramp means 20 and the platform means 46. As is apparent in FIG. 4, in this embodiment four identical pivot assembly means are provided which constitute the primary pivot connection means 44. Such pivot assemblies are well known in the art and will not be discussed further as their primary purpose is to provide a free pivotal joint between the first section 21 which includes the approach ramp 20 and the truck lifting means 23 which includes the platform means 46, the primary bolster means 32 and the load-supporting rear platform portion means 54.

The platform means extends from the pivotal means 44 to the primary bolster means 32 as shown from the bottom as shown in FIG. 4 and as shown from the side in FIG. 5. The flat top surface 15 of truck apron is also shown. As is apparent, the surface cover plate means 64 has a generally horizontally extending plane 63 which is parallel to, but spaced away from, said flat top surface 15. In a preferred embodiment as shown in FIG. 4, it consists of a series of channel 43 means which have been welded together. The platform means 46 could be constructed in any engineering satisfactory manner so long as at least two requirements are satisfied. The first of these being that it is strong enough to support the weight of a fully loaded semi-truck trailer and that it has a low enough silhouette such that the truck tires can still roll thereonto in the event that the approach ramp is missed.

Referring now to FIG. 5 directly behind the platform means and secured firmly thereto is the primary bolster means 32. As previously stated, it is through the primary bolster means 32 that the force of the lifting means is transmitted and is one of the major over-all load-carrying portions of the surface-mounted truck leveler 4 as evidenced from the positioning of the truck tires in FIG. 1. In a preferred embodiment, the primary platform bolster means 32 consists of a U-shaped channel 48 which extends from a first side 50 to the other or second side 52 of the surface-mounted truck leveler 4. In a preferred embodiment, it has a width of about 24 inches, plus or minus 6 inches. Again the particular design is not critical, however, it must be functionally capable of carrying the load of the truck, as well as thin enough to provide access. Rearwardly of and secured to said primary platform bolster means 32 is a load-supporting rear portion means 54 which in certain circumstances, depending on the configuration of the truck axles, may or may not be called upon to bear part of the load of the truck. Again the particular design is not critical as long as it is strong enough to support a load and as low as or lower then the other members of the truck lift means 23, as will hereafter be explained. In a preferred embodiment as partially shown in FIG. 5, it consists of a series of channel means 55 and 57 suitably secured together.

An additional feature of this particular invention is apparent from a consideration of FIG. 5 wherein it is shown that all of the members of the truck lift means 23, including the primary bolster means 32, are contained within the same envelope of space. It will be noted that the top 58 of the platform means 46, the top 60 of the primary platform bolster means 32 and the top 62 of the load-supporting rear platform portion means 54 are all in the same horizontally-extending plane. The same is true for the bottom 61 of the primary platform bolster means 32, the bottom 59 of the platform means 46 and the bottom 63 of the load-supporting rear platform portion means 54. As a result, the surface cover plate means 64 extends across the entire surface, with the exception of the approach ramp in a single, flat, horizontally extending plane which is parallel to that formed by the flat top surface means 15. That is, there are no raised or lowered portions in the surface cover plate means 64 to accommodate support features, etc. and the surface-mounted truck leveler lies flat on truck apron 16.

The lifting support tower means 22 and 24 are secured to the primary bolster means 32 which in turn are secured to both the load-supporting rear portion 54 and the platform means 46. Thus, the truck lift means 23 moves as a single unit. Referring to FIG. 4, the centrally located aperture means 64 for accommodating the truck restraining means 6 is clearly demonstrated. The particular shape or extent of the truck restraining aperture means 64 is totally dependent upon the design of the truck restraining means and thus this particular aperture is shown only to demonstrate a location and size thereof. Sufficed to say, that even in the extreme situation shown in FIG. 4 wherein the longitudinal side 66 of the primary bolster means 32 is exposed, the load-supporting rear portion means 54 must still be capable of load bearing.

In operation, the truck is backed onto the surface-mounted truck leveler 4 as shown in FIG. 2. Depending on the relationship of the tire set 5 to the truck itself, it is very possible that one portion thereof can be directly adjacent to the lifting support structures 22 and 24. The lifting means is actuated and the truck lift means 23 is pivoted around the primary pivot means 44 to achieve the desired relationship between the truck bed and the loading dock. The truck restraining device 6 is then engaged.

Various modes of carrying out the invention are contemplated as being within the scope of the following claims, particularly pointing out and distinctly claiming the subject matter which is regarded as invention.

We claim:

1. A surface mounted truck leveler means positioned upon a flat truck apron means of relatively uniform elevation for bringing the bed of a truck level with a contiguous dock means, said loading dock equipped with ancillary dock devices and truck restraining means, comprising:
   an approach ramp means;
   a platform means being thin and strong enough to support said truck and also allow unrestricted side access;
   a primary pivot means securing said approach ramp means to at least one of said platform means and said truck apron means;
   a load supporting rear portion means having an end means and a centrally located aperture means with an unrestricted opening for accommodating said truck restraining means;
   a primary platform bolster means positioned between and secured to said platform means and said load supporting rear portion; and
   lifting support tower means including means having first and second end means, said first end means being pivotally connected to said primary platform bolster means and said second end means secured to said truck apron means whereby upon actuation said platform means, said load supporting rear portion and said primary platform bolster means pivot as a single unit around said primary pivot means.

2. The surface mounted truck leveler means of claim 1 wherein, said means having first and second end means are hydraulic cylinders, said truck means includes a set of tire means supporting the rear end thereof and said first end means of said hydraulic cylinder means are secured to said primary platform means at a point adjacent thereto.

3. The surface mounted truck leveler means of claim 1 wherein said primary platform bolster means includes a horizontally extending U-shaped channel means having a width of about 24 inches, plus or minus 6 inches.

4. The surface mounted truck leveler means of claim 1 wherein:
   said platform means has a top surface means, said load supporting rear portion has a top surface means and said primary platform bolster has a top surface means, each of said top surface means lying in the same horizontally extending plane.

5. The surface mounted truck leveler means of claim 4 wherein:
   said platform means has a bottom surface means, said load-supporting rear portion has a bottom surface means and said primary platform bolster has a bottom surface means, each of said bottom surface means lying in the same horizontally extending plane.

* * * * *